United States Patent Office 3,135,618
Patented June 2, 1964

3,135,618
PROCESS FOR PRODUCING CEMENT USING PRETREATED OIL SHALE
Gunter Friese, Frankfurt am Main, Germany, assignor to Metallgesellschaft A.G., Frankfurt am Main, Germany, a German corporation
No Drawing. Filed Mar. 3, 1961, Ser. No. 93,038
Claims priority, application Germany Mar. 10, 1960
6 Claims. (Cl. 106—100)

The present invention relates to a process for the production of cement by heat treatment at elevated temperatures of a mixture of calcareous particle material and oil shale particle material, and more particularly to carrying out the heat treatment with oil shale particle material which has been pretreated by fluidized bed partial oxidation to cause the oxidation of the readily volatile constituents of the oil components of the shale.

It is conventional in the production of cement to add to the crude calcareous particle material an oil shale particle material in sufficient quantity to achieve the desired value of inorganic constituents in the final composition of the mixture. In this connection, although inorganic constituents are present in the oil shale, a considerable amount of organic constituents are also present which influence the over-all cement making process. Hence, in the direct sintering of a mixture of calcareous and oil shale particle material, in a cement furnace, such as a tubular rotary furnace or a sintering endless belt furnace, only a portion of the organic substances present in the oil shale is burned. While the burning of this portion of the organic substances contributes a certain amount of heat for the overall cement production, the remainder of the organic substances present in the oil shale roast uselessly and generate undesired smoke which renders the overall process somewhat inefficient.

Because of the foregoing drawbacks, it has been attempted to coke the oil shale at a low temperature prior to its incorporation with the crude calcareous powder material, in order to drive off volatile organic constituents and thereby avoid soot and smoke formation during the main cement forming reaction which would otherwise result. It has been further attempted to conduct such coking in a manner that a residual content of solid carbon will remain on the oil shale particles. This residue of solid carbon, of course, will be later utilized as fuel in the main sintering of the crude calcareous and oil shale mixture to form the cement. A preferred coking technique has been to carry out the coking of the oil shale in a conventional manner using a fluidized bed operation at comparatively low temperatures with respect to the sintering temperatures used for cement production, using an inert gas as fluidizing gas. Disadvantageously, however, fluidized bed roasting of the oil shale in accordance with the conventional technique requires an extraordinarily high investment for roasting apparatus. This is true since it is sought to avoid the production of smoke which permeates the environment, and accordingly a coking apparatus installation is necessary having a capacity large enough to accommodate the entire oil shale to be added to the crude calcareous powder. Additionally, condensers, separators, etc. are also required in order to recover the volatile and gaseous coking by-products, as well as combustion and steam generating facilities for utilizing the reaction products of the fluidized bed roasting operation.

It is an object of the present invention to overcome the foregoing drawbacks and to provide a process for the production of cement by substituting the conventional low temperature coking by a partial combustion in a non-oxidizing atmosphere at elevated temperatures using a mixture of calcareous particle material and pretreated oil shale particle material, wherein the conventional pretreatment of the oil shale particle material by non-oxidizing low temperature carbonization has been substituted by partial oxidation in a fluidized bed in the presence of a reduced oxygen supply based upon the total oxidizable constituents present in the oil shale, so as to cause oxidation of the readily volatile constituents of the oil components of the shale and coking of the difficultly volatile constituents thereof.

Other and further objects will become apparent from a study of the within specification.

It has been found in accordance with the present invention that the process for the production of cement by heat treatment at elevated temperatures of a mixture of calcareous particle material and oil shale particle material may be improved by carrying out the heating with oil shale particle material which has been pretreated by fluidized bed partial oxidation heat treatment in the presence of a reduced oxygen supply based upon the total oxidizable constituents present in the oil shale. In this manner, the oxidation of the readily volatile constituents of the oil components of the shale is effected as well as the coking of the difficultly volatile constituents of the oil shale.

The conventional fluidized bed heat treatment is generally carried out by passing an inert gas upwardly through the oil shale particle material at a velocity sufficient to suspend the material in fluidized condition. The fluidized bed heat treatment of the oil shale particle material according to the present invention is carried out in the presence of a reduced oxygen supply based on the total oxidizable constituents present in the oil shale so as to partially oxidize the organic constituents present in the shale, i.e. to completely oxidize the readily volatile constituents of the oil components of the shale and to coke the difficultly volatile constituents thereof.

Advantageously, the process for partial oxidation is carried out at a temperature within the range of from about 400–650 degrees C. and preferably within the range of from about 500–600 degrees C.

In order to maintain the fluidized condition, the oil shale is used in an average particle size of at most 10 millimeters in diameter and preferably at most 0.5 millimeter in diameter. Thus, if the oil shale to be treated is not small enough for the effective fluidization of the same at the gas velocity permissible to maintain the oxygen input within the limits set by the present invention, the oil shale particle material must be crushed to the physically required grain magnitude before carrying out the fluidized bed operation. Generally, grain magnitudes from about 0 to 10 millimeters are applicable, but it is preferred to pregrind the oil shale to a powder fineness of from about 0 to 0.5 mm. since in this manner not only is the fluidization at relatively low gas velocities made easier, but also the subsequent solids reaction in the cement sintering process is promoted. It will be appreciated that while an upper limit is preferably about 10 millimeter average particle size, the lower limit may be represented by the smallest possible particle size.

Therefore, in accordance with the present invention, the multiple number of steps always required in accordance with conventional cement production are now replaced by a single pretreatment step which avoids the undue soot and smoke generation which beset the prior art operations. Advantageously, the process of the invention permits the utilization of the total content of organic substances in the oil shale, on the one hand for the production of additional heat in the cement sintering furnace by way of the coked difficultly volatile constituents in the oil shale, and on the other hand, for the generation of steam normally used in connection with the cement producing plant. The process of the invention actually replaces the conventional separate pretreatment of the oil shale by coking of the oil shale in a non-oxidizing atmosphere by a partial combustion step carried out in a reduced oxygen supply. It was surprisingly found in this connection that it is possible to adjust and control the combustion such that only the readily volatile constituents of the organic substance or substances present in the oil shale are burned while the difficultly volatile constituents are coked into practically solid carbon without any significant portion of the organic substances present being roasted. As a prerequisite, the partial combustion is effectively carried out at comparatively low temperatures in a fluidized bed, such that the oil shale particle material making up the bed is impacted with an upward flow of inert gas at a velocity sufficient to suspend the oil shale particle material in fluidized condition. The reduced oxygen supply may be effected by employing a suspending gas which is poorer in oxygen than air. Notably, however, in accordance with a preferred embodiment of the invention, the reduced oxygen supply may be attained merely by using as fluidizing gas ordinary atmospheric air which is introduced into the bed in a reduced quantity with respect to the normal quantity otherwise used. In the latter case, the oil shale must be present in a particle size sufficiently small to allow thorough fluidization at the gas velocity used.

In accordance with the foregoing technique, sufficiently lower temperatures are used, i.e. between 400 and 650 degrees C., which at the flow rate of suspending gas containing an under-supply of oxygen results in the combustion of about ⅔ of the organic substances present in the oil shale, without the formation of undesired soot or troublesome smoke or oil fractions normally occurring with low temperature coking. The combustion gas obtained in this manner will generally not have more than 0.5% of oxygen which indicates that almost complete utilization of the oxygen present is made. Of course, it is also possible to control the partial oxidation such that the resulting combustion gas contains no oxygen at all, indicating complete consumption of oxygen for the oxidation of readily volatile constituents and coking of the remaining difficultly volatile constituents.

It will be appreciated that in accordance with the foregoing, particularly favorable results are achieved in relatively short periods of retention of the oil shale particle material in the fluidized bed furnace. Generally, periods of stay in the order of magnitude of several minutes down to several seconds have been found sufficient. These extremely short times of stay render possible an extraordinarily high specific throughput within the fluidized bed furnace, i.e. about 40 tons per day of oil shale per square meter cross section of fluidized bed furnace. It is even possible to achieve a maximum throughput of as high as 80 tons per day of oil shale per square meter of fluidized bed apparatus cross section, indicating that even for very large throughput capacity, only relatively small plant installations are necessary.

Of course, as is known, the heat liberated during the partial combustion in the fluidized bed may be utilized for the generation of steam. Suitably, cooling pipes may be disposed about the exterior of the fluidized bed apparatus and also in some cases within the fluidized bed portion itself. These cooling pipes actually serve as heat exchange means for the generation of steam used in connection with other contingent plant operations.

Specifically, the residue discharged from the partial combustion operation in the fluidized bed furnace is completely free from substances normally suitable for low temperature carbonization, yet still contains about ⅓ of the original carbon content in the form of solid carbon. This pre-treated oil shale may then be added to the calcareous particle material in such quantity that the desired chemical composition and particularly the hydraulic modulus of the cement starting mixture is maintained. Advantageously, in accordance with the invention, the solid carbon contained in the partial combustion residue of the oil shale may be utilized for contributing at least a part of the total heat requirement for the sintering of the mixture of calcareous starting material and oil shale to form cement. Preferably, such sintering is carried out in accordance with the conventional endless belt sintering technique whereby the material is passed along a horizontal path in fine particle form generally at temperatures of from 1350 to 1500 degrees C. until vitrification. The clinker thus produced may be subsequently pulverized and worked up in the well known manner to produce cement.

*Practical Experiment 1.—Known State of the Art*

An oil shale with an organic substance content corresponding to 9.9% of total carbon was ground to a particle size of 30 to 60 millimeters diameter and subjected to low temperature carbonization in a circulating gas shaft furnace at 500 degrees C. The vapors given off had to be condensed in a condensing plant connected up in series. A yield of oil with a calorific value of 9600 kcal./kg. amounting to 3% of the weight of the oil shale was obtained in the condensing plant. In addition 3 cubic meters at normal temperature and pressure/kg. of poor gas with a calorific value of 900 kcal./cubic meter at normal temperature and pressure was obtained following the condensing plant. The oil shale had a residue content of organic substance corresponding to a carbon content of 3.5%. Its composition was

| | Percent |
|---|---|
| Loss due to burning | 7.6 |
| $SiO_2$ | 32.2 |
| $Fe_2O_3$ | 9.9 |
| $Al_2O_3$ | 9.8 |
| CaO | 27.0 |
| MgO | 1.5 |
| $TiO_2$ | 0.5 |
| $SO_3$ | 10.3 |

31 parts by weight of the ground low temperature carbonization product were mixed with 69 parts by weight of limestone with the composition

| | Percent |
|---|---|
| $CaCO_3$ | 86 |
| $SiO_2$ | 5.3 |
| $Fe_2O_3+Al_2O_3$ | 3.0 |
| MgO | 2.7 | and 10 parts of coke breeze and the mixture was sintered in known manner after previous pelleting on a sintering belt at 1500 degrees C.

Samples were made from the sintered clinker ground to cement fineness (8% residue on a screen with 4900 meshes per $cm.^2$) and these samples had a compression strength of 250 kg./$cm.^2$ after three days and a compression strength of 440 kg./$cm.^2$ after twenty-eight days.

*Practical Experiment 2.—Test After a Modification of the Known State of the Art*

In a second experiment it was endeavored to produce from oil shale without the assistance of the complicated condensing plant a useful cement material by completely burning the organic constituents. The oil shale was fed onto a travelling grate for coke firing in a steam plant. It was not possible to obtain a uniform material so that different samples of cement clinker from the oil shale roast showed very unequal strengths. The carbon content in the roast varied between 2 and 6%. In addition it was not possible to burn the organic substances completely and considerable formation of slag, soot and smoke was observed.

*Practical Experiment 3.—Process According to the Invention*

The same oil shale as that used in Experiments 1 and 2 was ground to a particle fineness of less than 0.4 mm. 4600 kg./h. were fed on to a fluidized bed furnace with a grate area of 2.2 $m.^2$ which was subjected to 7000 cubic meters at normal temperature and pressure/hour air.

The waste gas was entirely free from organic constituents and had a residual oxygen content of 0.2%, corresponding to an excess of air of about 1% in the fluidizing gas.

The hot waste gases at about 600 degrees C. were cooled to about 150° C. in a waste heat boiler supplied with feed water, 1.7 tons per hour superheated steam at 40 atm. (atmosphere gauge) and 400 degrees C. being obtained.

The partly roasted oil shale had a residue content of organic substance corresponding to a carbon content of 3.1%. Its composition was practically the same as that of the low temperature carbonization residue obtained in the Experiment 1. 31 parts of it were also mixed with 69 parts by weight of ground limestone of the same composition as in Experiment 1 and 10 parts of coke breeze, the mixture being then pelletized and sintered on a sintering bed at 1500 degrees C. The samples produced from the sintered clinker ground to the fineness of cement had a compression strength of 270 kg./cm.$^2$ after 3 days and 470 kg./cm.$^2$ after 28 days.

Consequently a raw cement material which is absolutely equivalent to that obtained by the conventional process can be produced from oil shale by the process according to the invention without a condensating plant.

What is claimed is:

1. In the process for the production of cement by heating at elevated temperatures a mixture of calcareous particle material and preheated oil shale particle material, the improvement which comprises carrying out the heating with a pretreated oil shale particle material having an average particle size of at most about 10 mm. in diameter, said oil shale particle material before being pretreated containing oxidizable oil constituents including constituents which are readily volatile and combustible at a temperature of from about 400 to 650° C., the remaining constituents thereof being difficultly volatile yet cokable at said temperature of from about 400 to 650° C., said oil shale particle material being pretreated to remove substantially completely all of the readily volatile constituents thereof by complete combustion without distillation by the step of fluidized bed partial oxidation heat treatment at a temperature of from about 400 to 650° C. in the presence of a reduced oxygen supply based on the total oxidizable oil constituents present in the oil shale particle material sufficient to cause by such reduced oxygen supply substantially complete combustion of substantially all of the readily volatile oil constituents thereof and only coking without substantially any combustion of the remaining difficultly volatile oil constituents thereof.

2. Improvement according to claim 1 wherein the average particle size of said oil shale particle material is at most 0.5 mm. in diameter, and the partial oxidation heat treatment is carried out for a period in the order of magnitude of from about several seconds to several minutes at a temperature of from about 500 to 600° C.

3. Improvement according to claim 2 wherein the resulting petreated oil shale particle material is thereafter admixed with the calcareous particle material and subjected to the cement forming heating step in an oxidizing atmosphere sufficient to produce with the residue carbon content of the coked oil shale particle material a sintering temperature for cement formation.

4. Improvement according to claim 3 wherein the fluidized bed partial oxidation heat pretreatment is carried out while passing an inert gas upwardly through the oil shale particle material at a velocity sufficient to suspend said material in fluidized condition in the presence of said reduced oxygen supply used for said heat pretreatment.

5. In the process for the production of cement by heating at elevated temperatures a mixture of calcareous particle material and preheated oil shale particle material, where such oil shale particle material before being preheated contains oxidizable oil constituents including constituents which are readily volatile and combustible at a temperature of from about 400 to 650° C., the remaining constituents thereof being difficultly volatile yet cokable at said temperature of from about 400 to 650° C., the improvement which comprises carrying out the heating with such oil shale particle material which before being preheated contains said oxidizable oil constituents, said oil shale particle material having an average particle size of at most 0.5 mm. in diameter, and said oil shale particle material being first pretreated to remove substantially completely all of the readily volatile constituents thereof by complete combustion without distillation by the step of fluidized bed partial oxidation heat treatment at such temperature of from about 400 to 650° C. in the presence of a reduced oxygen supply based on the total oxidizable oil constituents present in the oil shale particle material sufficient to cause by such reduced oxygen supply substantially complete combustion of substantially all of the readily volatile oil constituents thereof and only coking without substantially any combustion of the remaining difficultly volatile oil constituents thereof.

6. In the process for the production of cement by heating at elevated temperatures a mixture of calcareous particle material and preheted oil shale particle material, where such oil shale particle material before being preheated contains oxidizable oil constituents including constituents which are readily volatile and combustible at a temperature of from about 500 to 600° C., the remaining constituents thereof being difficultly volatile yet cokable at said temperature of from about 500 to 600° C., the improvement which comprises carrying out the heating of the calcareous particle material with such oil shale particle material which before being preheated contains said oxidizable oil constituents, said oil shale particle material having an average particle size of at most 0.5 mm. in diameter, and said oil shale particle material being first pretreated to remove substantially completely all of the readily volatile constituents thereof by complete combustion without distillation by the step of fluidized bed partial oxidation heat treatment for a period in the order of magnitude of from about several seconds to several minutes at such tempearture of from about 500 to 600° C. in the presence of a reduced oxygen supply based on the total oxidizable oil constituents present in the oil shale particle material sufficient to cause by such reduced oxygen supply substantially complete combustion of substantially all of the readily volatile oil constituents thereof and only coking without substantially any combustion of the remaining difficultly volatile oil constituents thereof, the heating of the calcareous particle material with the resulting pretreated oil shale particle material being carried out in an oxidizing atmosphere sufficient to produce with the residue carbon content of the so-coked, pretreated oil shale particle material a sintering temperature for cement formation.

References Cited in the file of this patent

UNITED STATES PATENTS

| | | |
|---|---|---|
| 2,592,468 | Rex et al. | Apr. 8, 1952 |
| 2,719,112 | Kearby et al. | Sept. 27, 1955 |